(12) United States Patent
Wang et al.

(10) Patent No.: US 11,108,080 B2
(45) Date of Patent: Aug. 31, 2021

(54) LITHIUM AND SODIUM SOLID-STATE ELECTROLYTE MATERIALS

(71) Applicants: Samsung Electronics Co., Ltd, Gyeonggi-do (KR); The Regents of the University of California, Oakland, CA (US); Massachusetts Institute of Technology, Cambridge, MA (US)

(72) Inventors: Yan Wang, Brookline, MA (US); Lincoln Miara, Lincoln, MA (US); Gerbrand Ceder, Orinda, CA (US); William D. Richards, Osaka (JP)

(73) Assignees: SAMSUNG ELECTRONICS CO., LTD, Gyeonggi-do (KR); THE REGENTS OF THE UNIVERSITY OF CALIFORNIA, Oakland, CA (US); MASSACHUSETTS INSTITUTE OF TECHNOLOGY, Cambridge, MA (US)

(*) Notice: Subject to any disclaimer, the term of this patent is extended or adjusted under 35 U.S.C. 154(b) by 379 days.

(21) Appl. No.: 15/966,234

(22) Filed: Apr. 30, 2018

(65) Prior Publication Data
US 2018/0351207 A1    Dec. 6, 2018

Related U.S. Application Data

(60) Provisional application No. 62/513,946, filed on Jun. 1, 2017.

(51) Int. Cl.
*H01M 10/0562* (2010.01)
*H01M 10/0585* (2010.01)
(Continued)

(52) U.S. Cl.
CPC ......... *H01M 10/0562* (2013.01); *C01B 25/14* (2013.01); *H01M 10/052* (2013.01);
(Continued)

(58) Field of Classification Search
CPC ...... H01M 10/0562; H01M 2300/0068; C01B 25/14
See application file for complete search history.

(56) References Cited

U.S. PATENT DOCUMENTS 9,722,279 B2    8/2017 Mizuno et al.
2012/0328958 A1* 12/2012 Jeong ................... H01M 10/052
429/312
(Continued)

FOREIGN PATENT DOCUMENTS

| CN | 105932225 | 9/2016 |
| CN | 106684432 | 5/2017 |
| JP | 2016117640 | 6/2016 |

OTHER PUBLICATIONS

Wang, Yan et al., "Computational prediction and evaluation of solid-state sodiumsuperionic conductors Na7P3X11(X=O,S,Se)", Chemistry of Materials, Jul. 2017 DOI:10.1021/acs.chemmater. 7b02476; 23 pages.

(Continued)

*Primary Examiner* — Sarah A. Slifka
*Assistant Examiner* — Brent C Thomas
(74) *Attorney, Agent, or Firm* — Cantor Colburn LLP

(57) ABSTRACT

A solid electrolyte material is of the formula $A_{7\pm 2x}P_3 X_{(11\pm x)-y}O_y$ wherein wherein A is Li or Na, wherein X is S, Se, or a combination thereof, provided that when M is Li, X is Se, and wherein $0 \leq x \leq 0.25$ and $0 \leq y \leq 2.5$. Also, an electrochemical cell including the solid electrolyte material, and methods for the manufacture of the solid electrolyte material and the electrochemical cell.

17 Claims, 7 Drawing Sheets

(51) Int. Cl.
  *H01M 10/052*  (2010.01)
  *H01M 10/0525*  (2010.01)
  *C01B 25/14*  (2006.01)

(52) U.S. Cl.
  CPC ... *H01M 10/0525* (2013.01); *H01M 10/0585* (2013.01); *C01P 2002/72* (2013.01); *C01P 2002/76* (2013.01); *C01P 2002/77* (2013.01); *C01P 2006/40* (2013.01); *H01M 2300/0068* (2013.01)

(56) References Cited

U.S. PATENT DOCUMENTS

| | | | |
|---|---|---|---|
| 2014/0370398 A1* | 12/2014 | Lee | H01M 4/5815 429/322 |
| 2015/0030938 A1* | 1/2015 | Hayashi | C03B 19/00 429/319 |
| 2016/0372785 A1 | 12/2016 | Jang et al. | |
| 2017/0005324 A1 | 1/2017 | Stevens et al. | |
| 2017/0040637 A1 | 2/2017 | Ceder et al. | |
| 2018/0069264 A1* | 3/2018 | Martin | H01M 10/052 |

OTHER PUBLICATIONS

Hayashi, A. et al., "Superionic glass-ceramic electrolytes for room-temperature rechargeable sodium batteries", Nature Communications, Published: May 22, 2012; 5 pages.

* cited by examiner

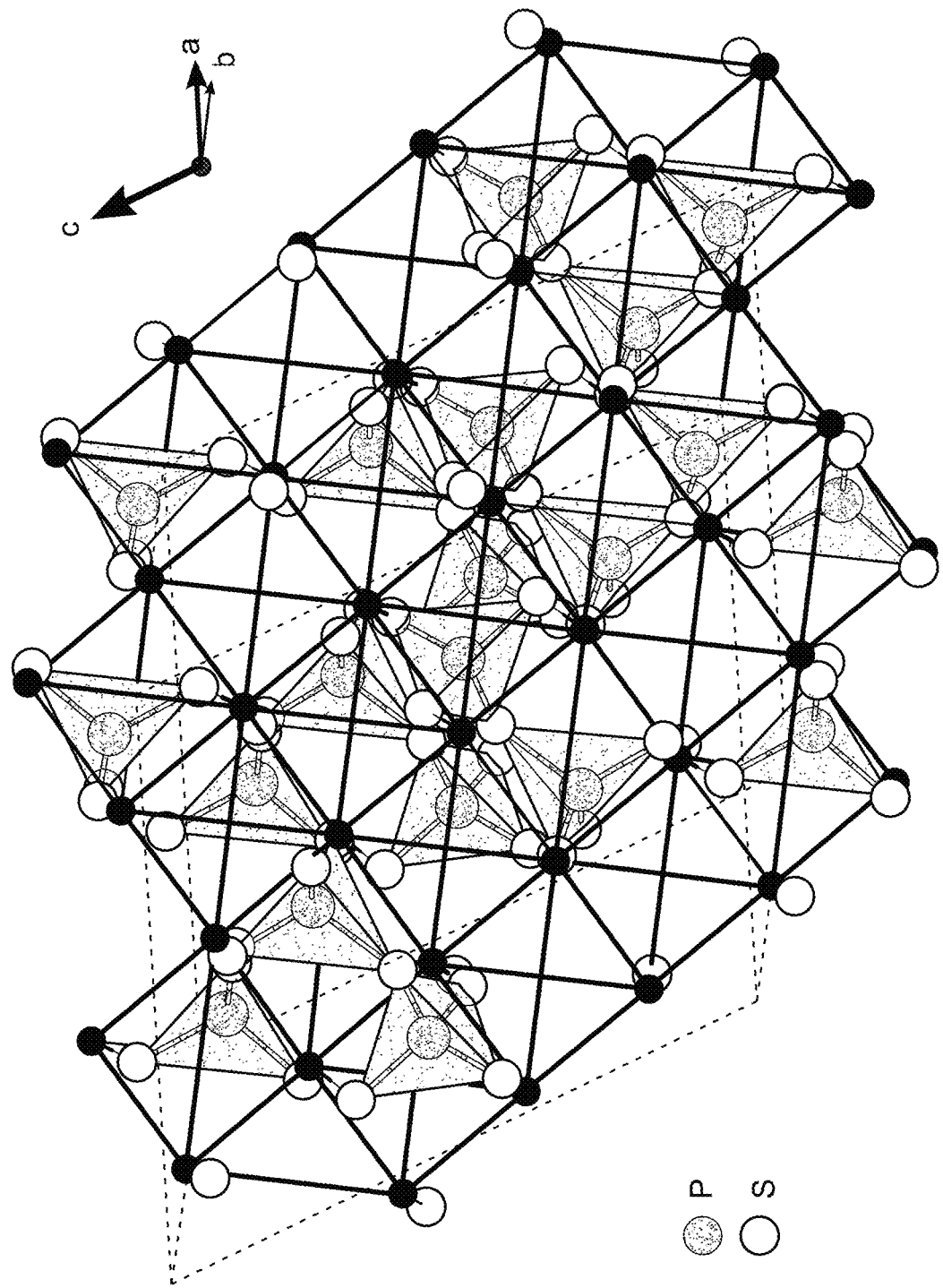

LITHIUM AND SODIUM SOLID-STATE ELECTROLYTE MATERIALS

CROSS REFERENCE TO RELATED APPLICATIONS

This application claims the benefit, under 35 U.S.C. § 119(e), of U.S. Provisional Patent Application Ser. No. 62/513,946, filed on Jun. 1, 2017, the content of which is incorporated herein by reference in its entirety.

BACKGROUND

Solid-state batteries that utilize a solid-state ionic conductor rather than a liquid electrolyte have potential to provide improved safety and energy density. Available solid-state electrolytes have conductivities which are significantly lower than that of liquid electrolytes, limiting their use in practical solid-state batteries.

Accordingly, there is a need in the art for an improved solid-state ionic conductor and a solid-state electrolyte including the solid-state ionic conductor.

SUMMARY

A solid electrolyte material is of the formula $A_{7\pm 2x}P_3X_{((11\pm x)-y)}O_y$, wherein A is Li or Na, wherein X is S, Se, or a combination thereof, provided that when M is Li, X is Se, and wherein $0 \leq x \leq 0.25$ and $0 \leq y \leq 2.5$.

An electrochemical cell comprises a positive electrode, a negative electrode, and a solid electrolyte material of the formula $A_{7\pm 2x}P_3X_{((11\pm x)-y)}O_y$, wherein A is Li or Na, wherein X is S, Se, or a combination thereof, provided that when M is Li, X is Se, and wherein $0 \leq x \leq 0.25$ and $0 \leq y \leq 2.5$, wherein the solid electrolyte material is disposed between the positive electrode and the negative electrode.

A method for the manufacture of a material for a solid electrolyte material comprises combining a sodium source or a lithium source and a precursor material comprising P and Se or S, provided that when a lithium source is used, the precursor material comprises P and Se, to form a mixture, and heat-treating the mixture to manufacture the material for a solid electrolyte, wherein the material is of the formula $A_{7\pm 2x}P_3X_{((11\pm x)-y)}O_y$, wherein A is Li or Na, wherein X is S, Se, or a combination thereof, provided that when M is Li, X is Se, and wherein $0 \leq x \leq 0.25$ and $0 \leq y \leq 2.5$.

A method for the manufacture of an electrochemical cell comprises providing a positive electrode, providing a negative electrode, and disposing a solid electrolyte material of the formula $A_{7\pm 2x}P_3X_{((11\pm x)-y)}O_y$, wherein A is Li or Na, wherein X is S, Se, or a combination thereof, provided that when M is Li, X is Se, and wherein $0 \leq x \leq 0.25$ and $0 \leq y \leq 2.5$, between the positive electrode and the negative electrode to manufacture the electrochemical cell.

The above described and other features are exemplified by the following figures and detailed description.

BRIEF DESCRIPTION OF THE DRAWINGS

The following figures are exemplary embodiments wherein the like elements are numbered alike.

FIG. 1B shows an embodiment in which a sulfur sublattice of $Na_7P_3S_{11}$ is mapped to a bcc (body-centered-cubic) framework in $Na_7P_3S_{11}$.

DETAILED DESCRIPTION

Figure 1A:
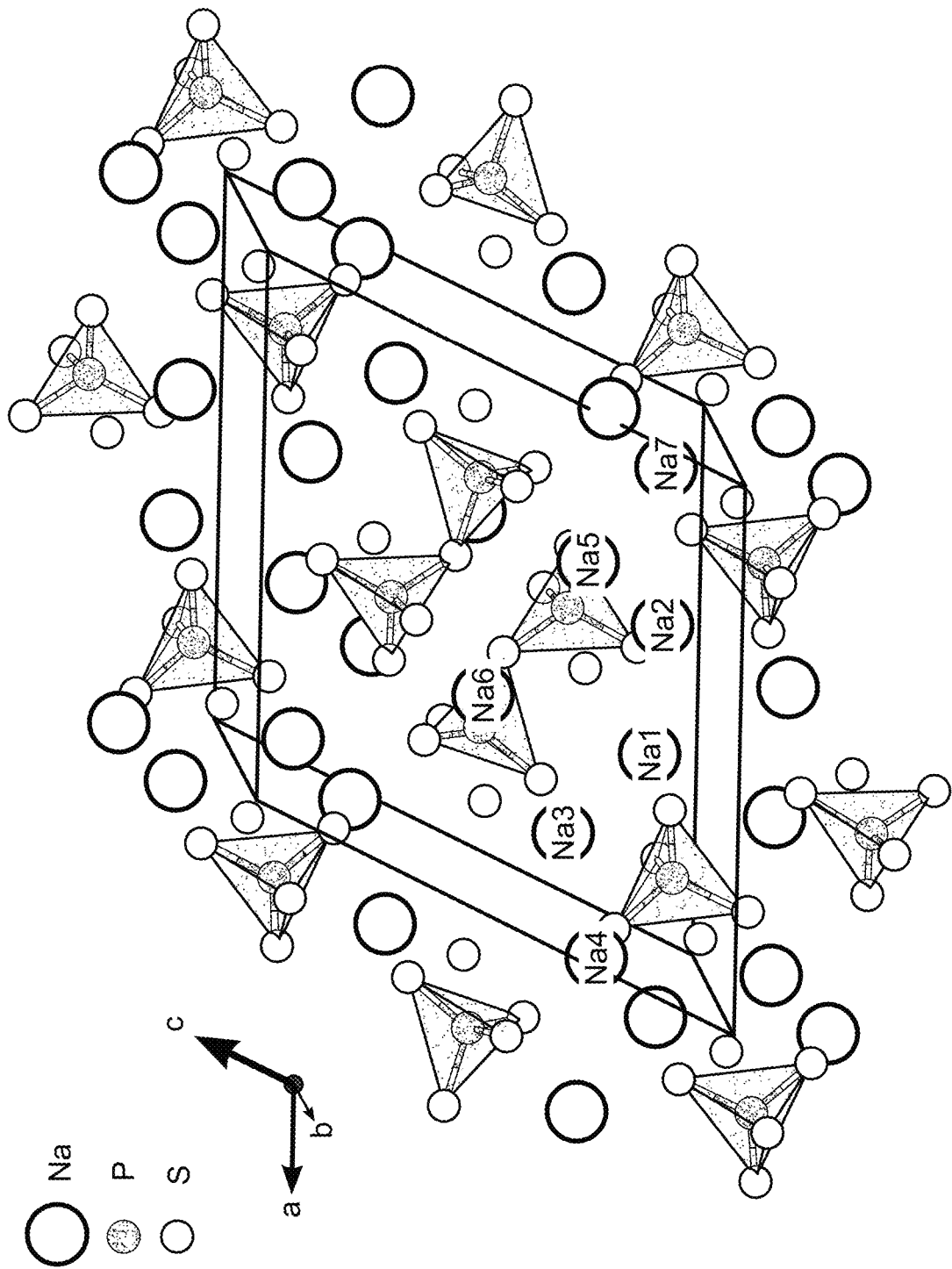
FIG. 1A shows an embodiment of a calculated crystal structure of $Na_7P_3S_{11}$.

The present inventors have discovered lithium- and sodium-containing solid electrolyte materials having different compositions and crystal structures than previously known solid electrolyte materials. The solid state electrolyte materials of the present disclosure were found to advantageously have high room temperature ionic conductivity, e.g., an ionic conductivity of at least 5 millisiemens per centimeter (mS/cm) at 23 degrees Celsius (° C.).

In an aspect, disclosed is a solid electrolyte material of the formula $A_{7\pm 2x}P_3X_{((11\pm x)-y)}O_y$, wherein A is Li or Na, wherein X is S, Se, or a combination thereof, provided that when A is Li, X is Se, and wherein $0 \leq x \leq 0.25$ and $0 \leq y \leq 2.5$. In an embodiment, y can be $0 \leq y \leq 2.5$, or $0.1 \leq y \leq 2.2$, or $0.5 \leq y \leq 2.0$, or $0.5 \leq y \leq 1.5$. In an embodiment, y can be 0, and the solid electrolyte material is of the formula $A_{7\pm 2x}P_3X_{11\pm x}$ wherein A is Li or Na, wherein X is S, Se, or a combination thereof, provided that when A is Li, X is Se, and wherein $0 \leq x \leq 0.25$. In an embodiment, x can be 0, and the solid electrolyte material is of the formula $A_7P_3X_{11}$ wherein A is Li or Na, wherein X is S, Se, or a combination thereof, provided that when A is Li, X is Se. An embodiment in which x is 0, y is 0, A is Li, and X is Se is specifically mentioned. An embodiment in which x is 0, y is 0, A is Na, and X is S is specifically mentioned. An embodiment in which x is 0, y is 0, A is Na, and X is S is specifically mentioned.

It will be understood that, in the above formula, when A is present in an amount of 7+2x, X is present in an amount of 11−x, such that the overall charge on the material is balanced, i.e., having no net charge to provide a neutral composition. Conversely, when A is present in an amount of 7−2x, X is present in an amount of 11+x to balance the charge.

Advantageously, the solid electrolyte material of the present disclosure has a high room temperature (e.g., 23° C.) ionic conductivity. For example, the solid electrolyte material can have an ionic conductivity of greater than or equal to 5 mS/cm at 23° C., or greater than or equal to 10 mS/cm at 23° C., or greater than or equal to 15 mS/cm at 23° C., e.g., an ionic conductivity of 5 to 55 mS/cm at 23° C., or 15 to 55 mS/cm at 23° C., or 25 to 55 mS/cm at 23° C. Ionic conductivity can be determined by impedance measurement as is generally known in the art. For example, and not by way of limitation, impedance measurements of the solid electrolyte can be performed with a Solartron MTS system. The impedance data can be collected from 1 MHz to 100 Hz with a DC voltage amplitude of 10 mV. To prepare the sample for impedance measurements, approximately 100-200 milligrams of the solid electrolyte (as a powder) is pressed into a disk-shaped pellet with the use of a ¼ inch die under a pressure of 1 to 1.2 tons. Blocking electrodes (e.g., indium metal disks) can then be affixed onto both sides of the pellet with a pressure of approximately 0.8 tons. The resulting pellet is assembled into a sealed cell using stainless steel rods as current collectors. Ionic conductivity data can be collected from room temperature to 80° C. during both the heating and cooling cycles. Within these ranges, the solid electrolyte material can have an ionic conductivity of 5 to 75 mS/cm at 23° C. Within this range, the solid electrolyte material can have an ionic conductivity of 5 to 70, or 5 to 65, or 5 to 55, or 5 to 50, or 5 to 45, or 5 to 35, or 5 to 25, or 5 to 15 mS/cm at 23° C.

In a specific embodiment, the solid electrolyte material can be of the formula $Li_7P_3Se_{11}$. Stated another way, A is Li, X is Se, and x is 0 in the above formula. The solid electrolyte material of the formula $Li_7P_3Se_{11}$ can have an ionic conductivity of 5 to 55 mS/cm at 23° C., or 15 to 55 mS/cm at 23° C., or 25 to 55 mS/cm at 23° C. X-ray diffraction can be useful in characterizing compounds such as those described herein. In an embodiment, the solid electrolyte material of the formula $Li_7P_3Se_{11}$ can have a body centered cubic crystal structure having an a-axis length lattice constant of 12.8 to 14.3 angstrom (Å), a b-axis length lattice constant of 6.1 to 6.9 Å, and a c-axis lattice constant of 12.7 to 14.1 Å, when analyzed by X-ray powder diffraction using Cu Kα radiation. Also, in an embodiment, the solid electrolyte material of the formula $Li_7P_3Se_{11}$ can have a first peak at a diffraction angle of 21 to 24 degrees 2θ, or 21.5 to 23.5 degrees 2θ, or 22 to 23 degrees 2θ, and a second peak at a diffraction angle of 26 to 29 degrees 2θ, or 26.5 to 28.5 degrees 2θ, or 27 to 28 degrees 2θ, when analyzed by X-ray powder diffraction using Cu Kα radiation.

In another specific embodiment, the solid electrolyte material can be of the above formula wherein A is Na, X is S, Se, or a combination thereof, and x is 0. For example, A can be Na, X can be S, and x can be 0, and the material can be of the formula $Na_7P_3S_{11}$. The solid electrolyte material of the formula $Na_7P_3S_{11}$ can have an ionic conductivity of 5 to 55 mS/cm at 23° C., or 5 to 25 mS/cm at 23° C., or 5 to 15 mS/cm at 23° C. In an embodiment, the solid electrolyte material of the formula $Na_7P_3S_{11}$ can have a body centered cubic crystal structure having an a-axis length lattice constant of 13.3 to 14.8 Å, a b-axis length lattice constant of 6.1 to 6.9 Å, and a c-axis lattice constant of 12.8 to 14.3 Å, when analyzed by X-ray powder diffraction using Cu Kα radiation. FIG. 1A shows an embodiment of a calculated crystal structure of $Na_7P_3S_{11}$. Also, in an embodiment, the solid electrolyte comprising the material of the formula $Na_7P_3S_{11}$ can have a first peak at a diffraction angle of 15 to 18 degrees 2θ, or 15.5 to 17.5 degrees 2θ, or 16 to 17 degrees 2θ, and a second peak at a diffraction angle of 26 to 29 degrees 2θ, or 26.5 to 28.5 degrees 2θ, or 27 to 28 degrees 2θ, when analyzed by X-ray powder diffraction using Cu Kα radiation.

In yet another specific embodiment, the solid electrolyte material can be of the above formula wherein A is Na, X is Se, and x is 0, and the material can be of the formula $Na_7P_3X_{11}$. The solid electrolyte material of the formula $Na_7P_3X_{11}$ can have an ionic conductivity of 5 to 55 mS/cm at 23° C., or 5 to 25 mS/cm at 23° C., or 5 to 15 mS/cm at 23° C. In an embodiment, the solid electrolyte material of the formula $Na_7P_3X_{11}$ can have a body centered cubic crystal structure having an a-axis length lattice constant of 14.3 to 15.9 Å, a b-axis length lattice constant of 6.5 to 7.2 Å, and a c-axis lattice constant of 13.2 to 14.7 Å, when analyzed by X-ray powder diffraction using Cu Kα radiation. Also, in an embodiment, the solid electrolyte material of the formula $Na_7P_3X_{11}$ can have a first peak at a diffraction angle of 14 to 17 degrees 2θ, or 14.5 to 16.5 degrees 2θ, or 15 to 16 degrees 2θ, and a second peak at a diffraction angle of 26 to 29 degrees 2θ, or 26.5 to 28.5 degrees 2θ, or 27 to 28 degrees 2θ, when analyzed by X-ray powder diffraction using Cu Kα radiation.

In an embodiment, the anion sublattice (i.e., $X_{((11\pm x)-y)}O_y$, not containing Na, Li, or P, wherein X is S, Se, or a combination thereof, provided that when M is Li, X is Se) of the material can have a body centered cubic crystal structure.

The solid electrolyte material of the formula $A_{7\pm 2x}P_3X_{((11\pm x)-y)}O_y$ (wherein A, X, x, and y are as defined above) can be made by a method comprising combining a sodium source or a lithium source and a material comprising P and X, wherein X is Se or S, provided that when a lithium source is used, X is Se, to form a mixture. The mixture can then be heat-treated to manufacture the solid electrolyte. Heat-treating the mixture can be, for example, at a temperature of 200 to 400° C. for a period of time of 2 to 20 hours.

The disclosed solid electrolyte can be manufactured using various methods that are known, including by solid state synthesis or by solution based synthesis, as further described in the Examples below. For example, in an embodiment the material can be made by a solid state synthesis wherein the sodium source or a lithium source and a starting material comprising P and X, wherein X is Se or S, provided that when a lithium source is used, X is Se, can be combined to form a mixture, wherein the combining can comprise high energy mixing, for example, mechanical milling, and can be for a time of 2 to 40 hours and using a rotating speed of 400 to 800 rpm. The resulting mixture can be heat-treated to effect crystallization at a temperature of 200 to 400° C. for a period of time of 2 to 20 hours. Preferably, the method can be carried out under inert conditions (e.g., in an atmosphere having oxygen and moisture levels of less than 1 part per million).

Alternatively, the material can be manufactured by a solution-based synthesis wherein the sodium source or a lithium source and a starting material comprising P and X, wherein X is Se or S, provided that when a lithium source is used, X is Se, can be combined in the presence of a solvent, mixed for 12 to 24 hours, and heated to a temperature effective to remove the solvent (e.g., at least 50° C., or at least 65° C., or at least 80° C.). The resulting mixture can be heat-treated to effect crystallization at a temperature of 200 to 400° C. for a period of time of 2 to 20 hours. Optionally, the mixture can be further heat-treated at a temperature of 200 to 400° C. for a period of time of 2 to 20 hours to further remove residual solvent. Solvents which can be useful for the solution based synthesis can include, but are not limited to, tetrahydrofuran, acetonitrile, N-methylformamide, ethyl acetate, dimethyl carbonate, dimethoxyethane, diethyleneglycol dimethyl ether, tetraethyleneglycol dimethyl ether, and the like, or a combination thereof. Remaining details of the heat-treating can be determined by one of skill in the art without undue experimentation and are thus not further elaborated on herein for clarity.

The solid electrolyte material described herein can be incorporated into an electrochemical cell. Disclosed is an electrochemical cell comprising the solid electrolyte material described herein. The electrochemical cell can be fabricated in any suitable shape, can be rectilinear, curvilinear, or a combination thereof, can be prismatic or cylindrical, and can have a wound or stacked configuration. The shape of the electrochemical cell is not limited to the above mentioned shapes, and can have any suitable shape.

The disclosed electrochemical cell comprises a positive electrode, a negative electrode, and the solid electrolyte material disposed between the positive electrode and the negative electrode. In an embodiment, the electrochemical cell can further comprise a separator disposed between the positive electrode and the negative electrode.

The positive electrode can be prepared by forming a positive active material layer including a positive active material on a current collector. The positive active material layer may be prepared using a vapor-state method or a solid state method. Examples of the vapor-state method include pulsed laser deposition ("PLD"), sputtering deposition, and chemical vapor deposition ("CVD"). However, the vapor state method is not limited thereto, and any suitable vaporization method known in the art may be used. Examples of the solid-state method include a sintering method, a sol-gel method, a doctor-blade method, screen printing, slurry casting, and powder compression. However, the solid-state method is not limited thereto, and any suitable solid-state method known in the art may be used.

The positive active material can be any of various suitable materials that are used in lithium batteries. For example, the positive active material can be a lithium transition metal oxide, a transition metal sulfide, or the like. For example, the positive active material can include a composite oxide of lithium and a metal selected from cobalt, manganese, and nickel. For example, the positive active material can be a compound represented by any of the Formulas: $Li_aC_{1-b}M_bD_2$ wherein $0.90 \le a \le 1.8$ and $0 \le b \le 0.5$; $Li_aE_{1-b}M_bO_{2-c}D_c$ wherein $0.90 \le a \le 1.8$, $0 \le b \le 0.5$, and $0 \le c \le 0.05$; $LiE_{2-b}M_bO_{4-c}D_c$ wherein $0 \le b \le 0.5$ and $0 \le c \le 0.05$; $Li_aNi_{1-b-c}Co_bM_cD_\alpha$ wherein $0.90 \le a \le 1.8$, $0 \le b \le 0.5$, $0 \le c \le 0.05$, and $0 \le \alpha \le 2$; $Li_aNi_{1-b-c}Co_bM_cO_{2-\alpha}Y_\alpha$ wherein $0.90 \le a \le 1.8$, $0 \le b \le 0.5$, $0 \le c \le 0.05$, and $0 \le \alpha \le 2$; $Li_aNi_{1-b-c}Co_bM_cO_{2-\alpha}Y_\alpha$ wherein $0.90 \le a \le 1.8$, $0 \le b \le 0.5$, $0 \le c \le 0.05$, and $0 \le \alpha \le 2$; $Li_aNi_{1-b-c}Mn_bM_cD_\alpha$ wherein $0.90 \le a \le 1.8$, $0 \le b \le 0.5$, $0 \le c \le 0.05$, and $0 \le \alpha \le 2$; $Li_aNi_{1-b-c}Mn_bM_cO_{2-\alpha}Y_\alpha$ wherein $0.90 \le a \le 1.8$, $0 \le b \le 0.5$, $0 \le c \le 0.05$, and $0 \le \alpha \le 2$; $Li_aNi_{1-b-c}Mn_bM_cO_{2-\alpha}Y_2$ wherein $0.90 \le a \le 1.8$, $0 \le b \le 0.5$, $0 \le c \le 0.05$, and $0 \le \alpha \le 2$; $Li_aNi_bE_cG_dO_2$ wherein $0.90 \le a \le 1.8$, $0 \le b \le 0.9$, $0 \le c \le 0.5$, and $0.001 \le d \le 0.1$; $Li_aNi_bCo_cMn_dGeO_2$ wherein $0.90 \le a \le 1.8$, $0 \le b \le 0.9$, $0 \le c \le 0.5$, $0 \le d \le 0.5$, and $0.001 \le e \le 0.1$; $Li_aNiG_bO_2$ wherein $0.90 \le a \le 1.8$ and $0.001 \le b \le 0.1$; $Li_aCoG_bO_2$ wherein $0.90 \le a \le 1.8$ and $0.001 \le b \le 0.1$; $Li_aMnG_bO_2$ where $0.90 \le a \le 1.8$ and $0.001 \le b \le 0.1$; $Li_aMn_2G_bO_4$ wherein $0.90 \le a \le 1.8$ and $0.001 \le b \le 0.1$; $QO_2$; $QS_2$; $LiQS_2$; $V_2O_5$; $LiV_2O_2$; $LiRO_2$; $LiNiVO_4$; $Li_{(3-f)}J_2(PO_4)_3$ ($0 \le f \le 2$); $Li_{(3-f)}Fe_2(PO_4)_3$ wherein $0 \le f \le 2$; and $LiFePO_4$, in which in the foregoing positive active materials C is Ni, Co, or Mn; M is Al, Ni, Co, Mn, Cr, Fe, Mg, Sr, V, or a rare-earth element; D is O, F, S, or P; E is Co or Mn; Y is F, S, or P; G is Al, Cr, Mn, Fe, Mg, La, Ce, Sr, or V; Q is Ti, Mo or Mn; R is Cr, V, Fe, Sc, or Y; and J is V, Cr, Mn, Co, Ni, or Cu. Examples of the positive active material include $LiCoO_2$, $LiMn_xO_{2x}$ where $x=1$ or 2, $LiNi_{1-x}Mn_xO_{2x}$ where $0 \le x \le 1$, $LiNi_{1-x-y}Co_xMn_yO_2$ where $0 \le x \le 0.5$ and $0 \le y \le 0.5$, $LiFePO_4$, $TiS_2$, $FeS_2$, $TiS_3$, and $FeS_3$.

In an embodiment, the positive active material can be any of various suitable materials that are used in sodium-ion batteries. For example, the positive active material can be a compound in which sodium intercalation reversibly occurs, such as an oxide of the formula $NaM^1_aO_2$ (e.g., $NaFeO_2$, $NaMnO_2$, $NaNiO_2$, or $NaCoO_2$); or an oxide represented by the formula $NaMn_{1-a}M^1_aO_2$, wherein $M^1$ is at least one transition metal element, and $0 \le a \le 1$. Representative positive active materials include $Na[Ni_{1/2}Mn_{1/2}]O_2$, $Na_{2/3}[Fe_{1/2}Mn_{1/2}]O_2$, and the like; an oxide represented by $Na.44Mn-aM^1_aO_2$, an oxide represented by $Na_{0.7}Mn_{1-a}M^1_aO_{2.05}$ (wherein $M^1$ is at least one transition metal element, and $0 \le a \le 1$); an oxide represented by $Na_bM^2_cSi_{12}O_{30}$ as $Na_6Fe_2Si_{12}O_{30}$ or $Na_2Fe_5Si_{12}O$ (wherein $M^2$ is at least one transition metal element, $2 \le b \le 6$, and $2 \le c \le 5$); an oxide represented by $Na_dM^3_eSi_6O_{18}$ such as $Na_2Fe_2Si_6O_{18}$ or $Na_2MnFeSi_6O_{18}$ (wherein $M^3$ is at least one transition metal element, $3 \le d \le 6$, and $1 \le e \le 2$); an oxide represented by $Na_fM^4_gSi_2O_6$ such as $Na_2FeSiO_6$ (wherein $M^4$ is at least one element selected from transition metal elements, magnesium (Mg) and aluminum (Al), $1 \le f \le 2$, and $1 \le g \le 2$); a phosphate such as $NaFePO_4$, $Na_3Fe_2(PO_4)_3$, $Na_3V_2(PO_4)_3$, $Na_4Co_3(PO_4)_2P_2O_7$ and the like; a borate such as $NaFeBO_4$ or $Na_3Fe_2(BO_4)_3$; a fluoride represented by $Na_hM^5F_6$ such as $Na_3FeF_6$ or $Na_2MnF_6$ (wherein $M^5$ is at least one transition metal element, and $2 \le h \le 3$), a fluorophosphate such as $Na_3V_2(PO_4)_2F_3$, $Na_3V_2(PO_4)_2FO_2$ and the like. As used herein, "transition metal element" refers to an element of Groups 3 to 11 of the Periodic Table of the Elements. The positive active material is not limited to the foregoing and any suitable positive active material that is used in the art can be used. In an embodiment, the positive active material preferably comprises a layered-type oxide cathode material such as $NaMnO_2$, $Na[Ni_{1/2}Mn_{1/2}]O_2$ and $Na_{2/3}[Fe_{1/2}Mn_{1/2}]O_2$, a phosphate cathode such as $Na_3V_2(PO_4)_3$ and $Na_4Co_3(PO_4)_2P_2O_7$, or a fluorophosphate cathode such as $Na_3V_2(PO_4)_2F_3$ and $Na_3V_2(PO_4)_2FO_2$. A combination comprising at least one of the foregoing positive active materials can be used.

In addition, the positive active material layer may further include a conductive agent and a binder. Any suitable conductive agent and binder, such as a conductive agent and/or binder used in the art, may be used.

A binder for the positive electrode can facilitate adherence between components of the positive electrode, such as the positive active material and the conductor, and adherence of the positive electrode to a current collector. Examples of the binder can include polyacrylic acid (PAA), polyvinylidene fluoride (PVdF), polyvinyl alcohol (PVA), carboxymethyl cellulose (CMC), starch, hydroxypropyl cellulose, regenerated cellulose, polyvinylpyrrolidone, tetrafluoroethylene, polyethylene, polypropylene, ethylene-propylene-diene monomer (EPDM), sulfonated EPDM, styrene-butadiene-rubber, fluorinated rubber, a copolymer thereof, or a combination thereof. The amount of the binder can be in a range of about 1 part by weight to about 10 parts by weight, for example, in a range of about 2 parts by weight to about 7 parts by weight, based on a total weight of the positive active material. When the amount of the binder is in the range above, e.g., about 1 part by weight to about 10 parts by weight, the adherence of the positive electrode to the current collector may be suitably strong.

The conductive agent can include, for example, carbon black, carbon fiber, graphite, carbon nanotubes, graphene, or a combination thereof. The carbon black can be, for example, acetylene black, Ketjen black, Super P carbon, channel black, furnace black, lamp black, thermal black, or a combination thereof. The graphite can be a natural graphite or an artificial graphite. A combination comprising at least one of the foregoing conductive agents can be used. The positive electrode can additionally include an additional conductor other than the carbonaceous conductor described above. The additional conductor can be an electrically conductive fiber, such as a metal fiber; a metal powder such as a fluorinated carbon powder, an aluminum powder, or a nickel powder; a conductive whisker such as a zinc oxide or a potassium titanate; or a polyphenylene derivative. A combination comprising at least one of the foregoing additional conductors can be used.

The positive electrode can further comprise an electrolyte. When present, the electrolyte can comprise one or more salts dissolved in one or more solvents, ionic liquid, gel, ionogel, highly concentrated, or a solid. In an embodiment, the electrolyte of the positive electrode can be a solid electrolyte and can comprise a ceramic, glass ceramic, or polymer. The solid electrolyte can be of the same composition as the electrolyte in the separator, or it can be selected to be more electrochemically stable with the positive active material.

The negative electrode can be produced from a negative active material composition including a negative active material, and optionally, a conductive agent, and a binder. The negative active material that can be used in the electrochemical cell include a negative active material capable of storing and releasing sodium or lithium ions electrochemically at a desirable potential, e.g., at ±0.5, ±0.3, or ±0.1 Volts (V) versus Na/Na$^+$. The negative electrode active material can be a known negative electrode active material for a sodium-ion or lithium-ion battery such as hard carbon, soft carbon, carbon black, ketjen black, acetylene black, activated carbon, carbon nanotube, carbon fiber, amorphous carbon, or a combination thereof. Also usable are sodium- or lithium-containing metals and alloys, wherein the metal can be any suitable metal, e.g., Sn, Sb, Ge. Sodium- or lithium-containing metal oxides, metal nitrides, and metal sulfides are also useful, in particular wherein metal can be Ti, Mo, Sn, Fe, Sb, Co, V. Also useable are phosphorous (P) or metal doped phosphorous (e.g., NiP$_3$). The negative active material is not limited to the foregoing and any suitable negative active material can be used.

As the separator, when present, a porous olefin film such as polyethylene and polypropylene, and polymer electrolyte can be used. The separator can be porous, and a diameter of a pore of the separator can be in a range of about 0.01 to about 10 micrometers (μm), and a thickness of the separator can be in a range of about 5 to about 300 μm. In greater detail, the separator can be a woven or a non-woven fabric comprising an olefin-based polymer such as polypropylene or polyethylene; or a glass fiber.

The solid electrolyte disposed between the positive electrode and the negative electrode can be as described above. In an embodiment, the solid electrolyte material is of the formula Li$_7$P$_3$Se$_{11}$. In an embodiment, the solid electrolyte material is of the formula Na$_7$P$_3$X$_{11}$, wherein X is S or Se.

The electrochemical cell can be manufactured by providing a positive electrode, providing a negative electrode, and disposing the disclosed solid electrolyte material between the positive electrode and the negative electrode to manufacture the electrochemical cell. When the electrochemical cell further comprises a separator, the method can further comprise disposing a separator between the positive electrode and the negative electrode. The separator can be adjacent the positive electrode and the solid electrolyte, adjacent the negative electrode and the solid electrolyte, or both if two separators are used.

This disclosure is further illustrated by the following examples, which are non-limiting.

EXAMPLES

First-principles calculations were performed using density functional theory as implemented in the plane-wave-basis-set Vienna ab initio simulation package (VASP). Projector augmented wave potentials with kinetic energy cutoff of 520 eV were employed in all structural optimizations and total-energy calculations, and the Exchange and correlation functionals were described within Perdew-Burke-Ernzerhof generalized gradient approximation (GGA-PBE). A k-point density of at least 500 per number of atoms in the unit cell was used in all calculations.

A structural matching algorithm was used to evaluate how well the anion sublattice of each material mapped onto to a body-centered-cubic (bcc) framework. The algorithm finds possible affine mappings which can transform the anion lattice exactly onto lattice points belonging to the perfect bcc lattice, and choose the mapping with the minimal root-mean-square (rms) distance between the atom positions in the two lattices. Only affine transformations preserving the bcc supercell lattice angles to within 5°, and supercell lattice vector lengths to within 20% are considered, and the maximum allowed root-means-square (rms) distance is set to be $0.4(V/n) \cdot 10^{1/3}$, where V/n is the normalized volume by number of atoms.

In the reported experimental crystal structure of Li$_7$P$_3$S$_{11}$, or Li$_7$(PS$_4$)(P$_2$S$_7$) to better represent the crystal chemistry, both PS$_4^{3-}$ thiophosphate and P$_2$S$_7^{4-}$ pyro-thiophosphate (in which two PS$_4$ tetrahedra share one corner S atom) groups are present, with Li atoms filling the substantially distorted tetrahedral cavities formed by the S anions. This structure was adopted as the starting crystal structure for the optimization of Li$_7$P$_3$X$_{11}$ (X=Se) and Na$_7$P$_3$X$_{11}$ (X=S, Se) via chemical substitutions of Li with Na and S with Se. The predicted structural parameters of these chemically substituted compounds obtained from DFT optimizations, are very similar to that of Li$_7$P$_3$S$_{11}$ (triclinic centro-symmetric space group P-1). The optimized lattice parameters are listed below in Table 1. The unit-cell volumes of the lithium and sodium selenides have 16-17% larger volumes than the corresponding sulfide compound. Without wishing to be bound by theory, these differences are believed to be due to the anionic radii difference among S$^{2-}$ and Se$^{2-}$. The volumes of sodium compounds are around 22-30% larger than the lithium counterparts, due to the larger ionic radii of Na$^+$ (115 pm) compared to Li$^+$ (90 pm).

TABLE 1

| Material | Lattice parameters | | | | | | Unit-cell volume |
| | a (Å) | b (Å) | c (Å) | α (°) | β (°) | γ (°) | (Å$^3$) |
| --- | --- | --- | --- | --- | --- | --- | --- |
| Li$_7$P$_3$Se$_{11}$ | 13.55 | 6.49 | 13.38 | 103.58 | 113.45 | 74.19 | 1027.61 |
| Na$_7$P$_3$S$_{11}$ | 14.01 | 6.54 | 13.56 | 103.29 | 115.18 | 76.58 | 1080.62 |
| Na$_7$P$_3$Se$_{11}$ | 15.12 | 6.85 | 13.96 | 103.97 | 115.60 | 76.74 | 1252.08 |

Using a structure matching algorithm, it was confirmed that all calculated Li$_7$P$_3$X$_{11}$ (X=Se) and Na$_7$P$_3$X$_{11}$ (X=S or Se) structures have a bcc-like anion frameworks. The mapping of the anion sublattice of Na$_7$P$_3$S$_{11}$ to a bcc lattice is given as an example shown in FIG. 1B, where the perfect bcc lattice is represented by the solid black spheres connected by the black lines.

The ionic diffusivity and conductivity of the materials was also examined. The ionic diffusivity and conductivity in the materials were calculated using ab-initio molecular dynamics (AIMD) based on density functional theory (DFT). The simulations were taken on the canonical ensemble with a time step of 2 femtoseconds (fs), and the temperature was initialized at 100 Kelvin (K) and elevated to the appropriate temperature (600, 720, 900, 1200 and 1500 K) with simulations lasting 200 picoseconds (ps) for statistical analysis. Each supercell consists of 4 formula units (84 atoms). A gamma-point-only sampling of k-space and a lower but sufficient plane-wave energy cutoff than the structural optimization calculation was used. The Na diffusivity was calculated from atomic trajectories, and the activation energy and extrapolation to room temperature diffusivity were obtained assuming Arrhenius behavior.

Figure 2:
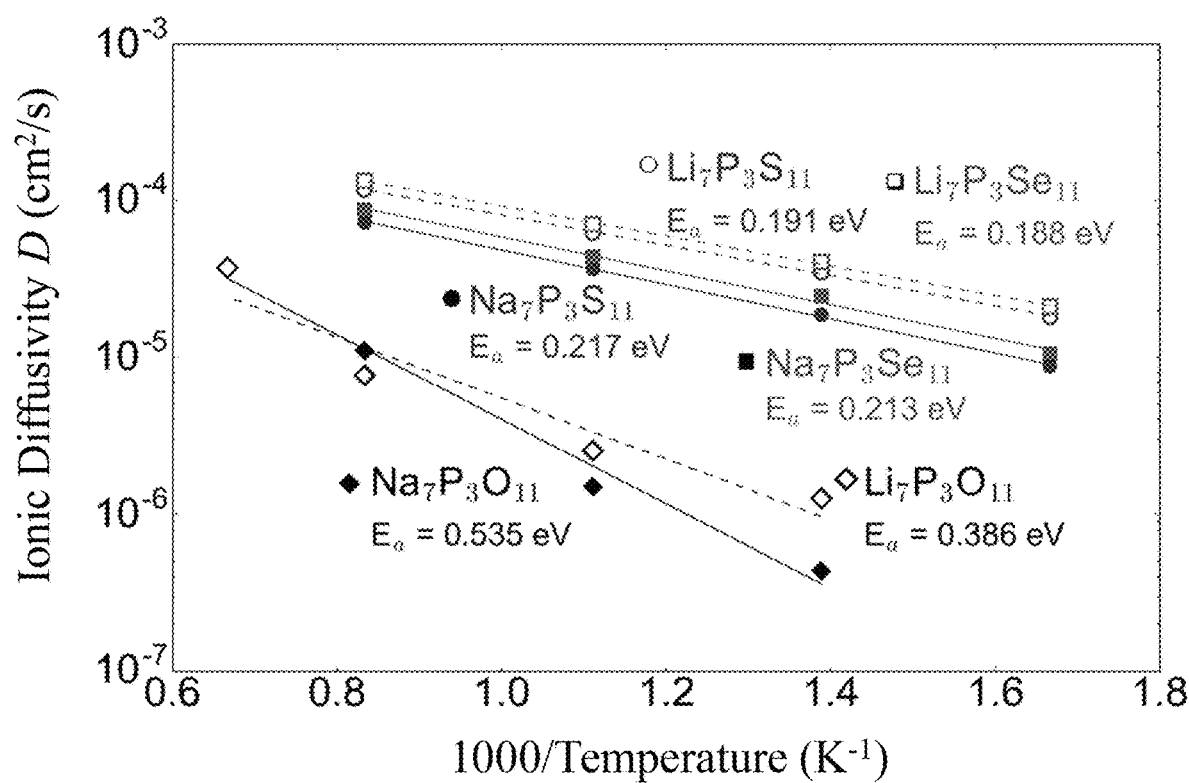
FIG. 2 is a graph of ionic diffusivity (D, square centimeters per second, cm²/s) versus temperature (1000/T, K⁻¹) and is an Arrhenius plot of calculated Li and Na diffusivities in the solid-state electrolyte $Li_7P_3Se_{11}$ and $Na_7P_3X_{11}$ (X=S, Se), and selected other compounds for comparison, where lines are least-squares fits to the diffusivity data for sulfides and selenides.

For the $Li_7P_3Se_{11}$ and $Na_7P_3X_{11}$ (X=S or Se) materials examined here, diffusion calculations were performed at temperatures between 600 K and 1200 K without melting of the crystal structure. The calculated ionic diffusivities are shown in the Arrhenius plots in FIG. 2. The activation energies (reported in electron volts, eV) obtained from the Arrhenius plots and the extrapolated room temperature conductivities are summarized in Table. 2.

TABLE 2

| Material | Activation energy (eV) | R.T. conductivity (mS/cm) |
|---|---|---|
| $Li_7P_3Se_{11}$ | 0.188 | 47.94 |
| $Na_7P_3S_{11}$ | 0.217 | 10.97 |
| $Na_7P_3Se_{11}$ | 0.213 | 12.56 |

To better understand why the anion substitution has such an effect on the ionic conductivity of $Na_7P_3X_{11}$, the Na diffusion pathways were analyzed by calculating the ionic probability densities obtained from AIMD simulations, and the Na energy landscape by calculating the Na site energies within the crystal structures. The results are shown in FIG. 3. The site energy at each site i is defined as the negative of the vacancy energy referenced to the average vacancy energy: $E_{site}^i = \Sigma_i E_{vacancy}^i/n - E_{vacancy}^i$, where $E_{vacancy}^i$ is the total energy of the unit-cell containing a Na vacancy at the i site, and n is the total number of Na sites in the structure.

Figure 3A:
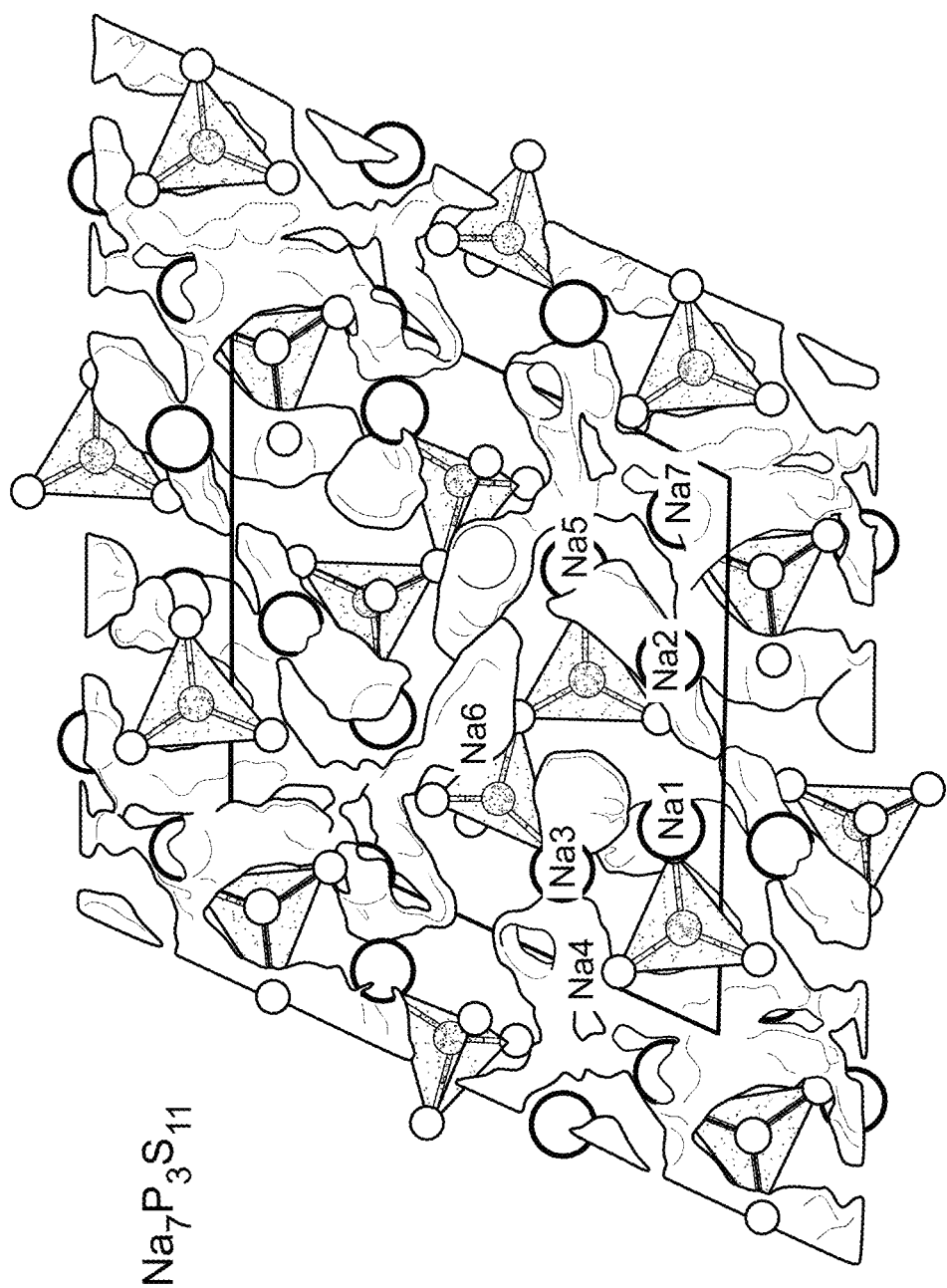
FIG. 3A shows a calculated sodium (Na)-ion probability density in $Na_7P_3S_{11}$, obtained from ab initio molecular dynamics simulations at 900 K with simulations lasting 200 picoseconds (ps), wherein isosurfaces are plotted at isovalues of twice the mean value of the density ($2P_0$).
Figure 3B:
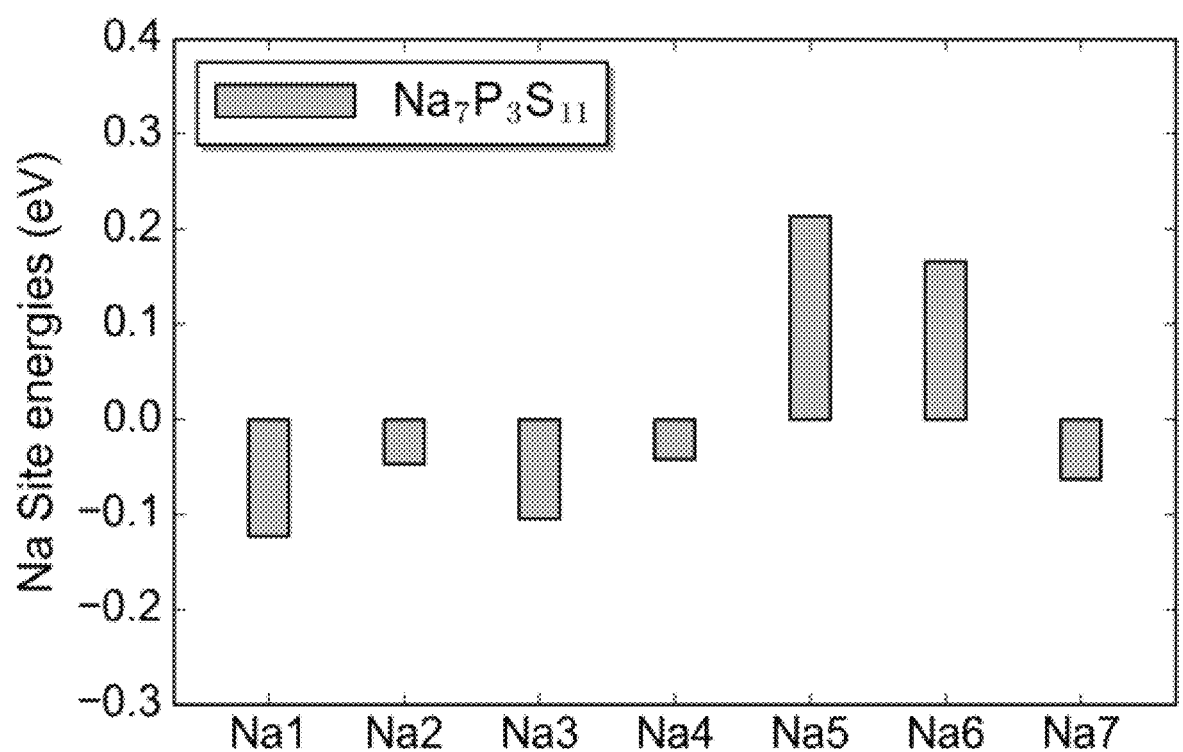
FIG. 3B is a graph of Na site energy (electron volts, eV) for Na sites 1-7 for $Na_7P_3S_{11}$, wherein the Na site energy at each site is defined as the negative energy of a Na-ion vacancy referenced to the average of all site energies.
Figure 3C:
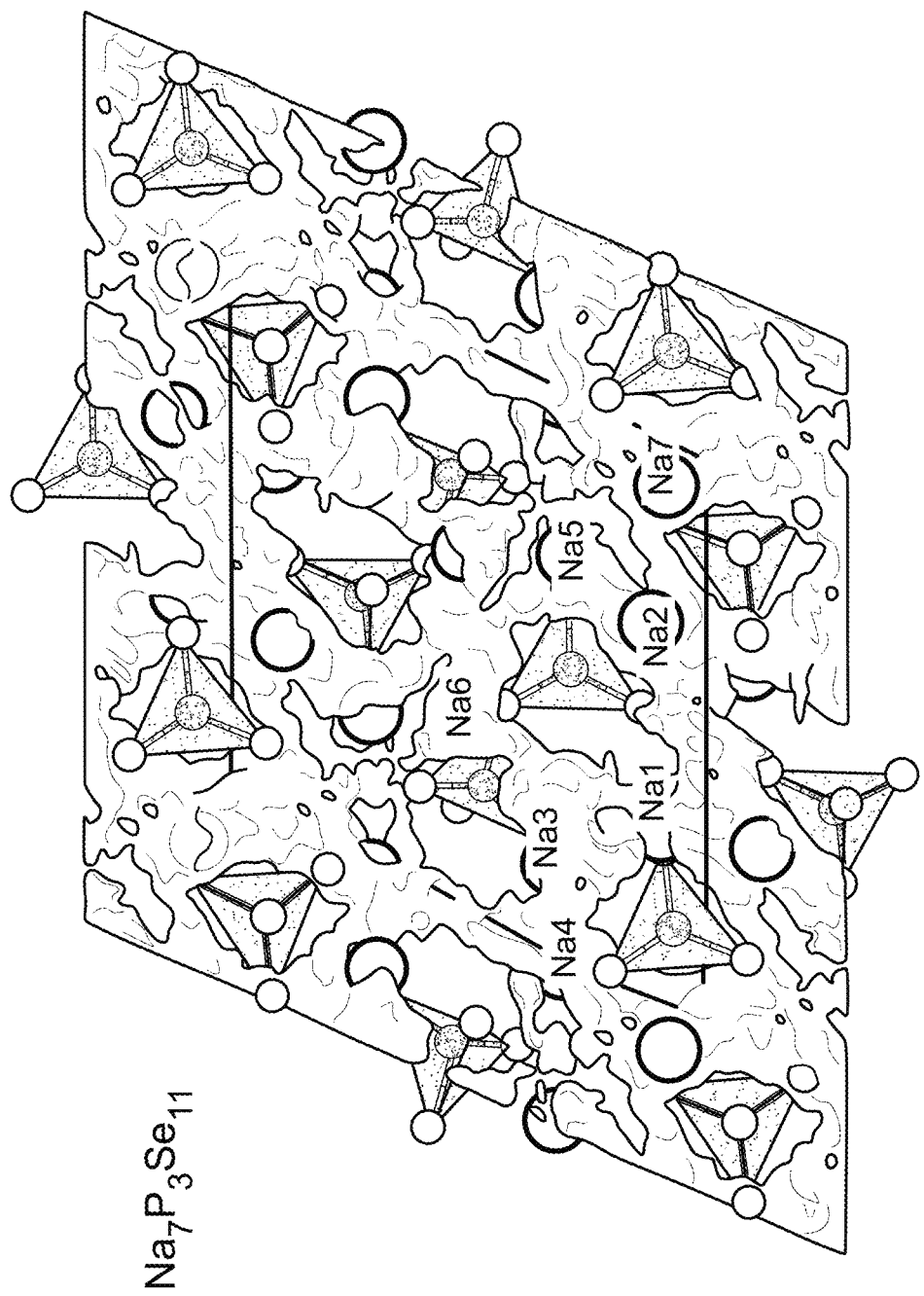
FIG. 3C shows a calculated sodium (Na)-ion probability density in $Na_7P_3X_{11}$, obtained from ab initio molecular dynamics simulations at 900 K with simulations lasting 200 picoseconds (ps), wherein the isosurfaces are plotted at isovalues of $2P_0$, wherein $P_0$ is defined as the mean value of the density.
Figure 3D:
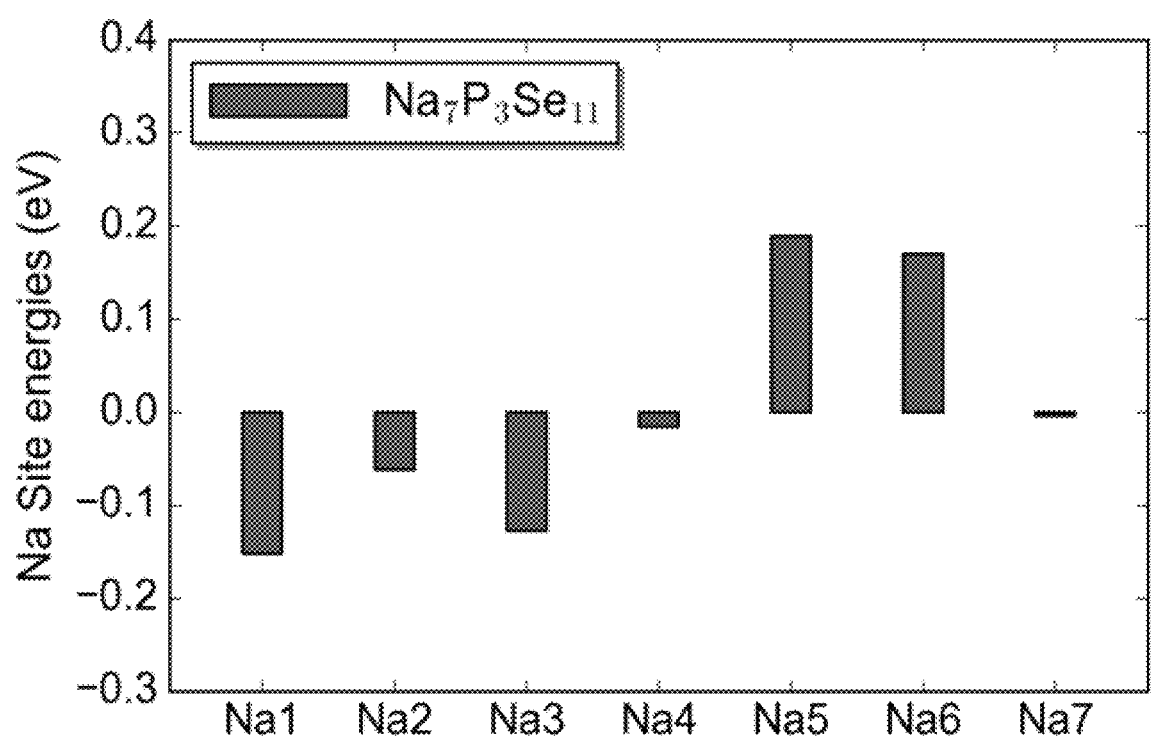
FIG. 3D is a graph of Na site energy (electron volts, eV) for Na sites 1-7 for $Na_7P_3Se_{11}$, wherein Na site energy at each site is defined as the negative energy of a Na-ion vacancy referenced to the average of all site energies.

The distribution of Na ions from probability density analysis demonstrates that the ionic conduction in $Na_7P_3S_{11}$ and $Na_7P_3X_{11}$ occurs through a three-dimensional diffusion network connecting all seven distinct crystallographic sites (FIGS. 3A and 3C). The evenly distributed probability densities indicate that Na ions have a relatively flat energy landscape along the channels, which can also be seen from the calculated Na site energies (FIGS. 3B and 3D) in $Na_7P_3S_{11}$ and $Na_7P_3X_{11}$.

Based on the results described above, the Na-ion conductors disclosed herein are additions to the growing family of alkali ionic conductors with a bcc anion framework and are exceptionally high ionic conductivity. The room temperature (RT) conductivities predicted, 10.97 mS cm$^{-1}$ for $Na_7P_3S_{11}$ and 12.56 mS cm$^{-1}$ for $Na_7P_3X_{11}$, are significantly higher than that of any known solid Na-ion sulfide or selenide conductor.

The solid electrolyte materials disclosed herein can be prepared using various techniques that are generally known in the art, for example by a solid state or solution-based approach.

In an exemplary solid state synthesis, $Li_2Se$ and $P_2S_5$ will be mixed in a stoichiometric ratio. These materials will be mechanically milled with a planetary ball mill apparatus for 2 to 40 hours at a rotating speed of 400 to 800 rpm. The resulting amorphous powder will be crystallized via high-temperature annealing at 200 to 400° C. for 2 to 20 hours, followed by cooling to room temperature. A similar procedure can be employed using $Na_2X$, where X is S, Se, or a combination thereof in place of the $Li_2Se$. All sample preparation processes will be executed in an inert atmosphere (oxygen and moisture levels <1 ppm) employing sealed and Ar-filled containers to suppress any sample degradation.

In an exemplary solution-based synthesis, $Li_2Se$ and $P_2S_5$ will be dispersed into tetrahydrofuran (THF), acetonitrile (ACN) and mixed solvent of tetrahydrofuran and acetonitrile (THF & ACN, volume ratio=1:1) in an argon-filled glove box, respectively. The solutions of THF, ACN and THF&ACN will be stirred for 12 to 24 hours. After the reaction, the three precursor solutions will be dried at 80° C. to remove the organic solvent. The obtained powders will be heated at 200 to 400° C. in argon atmosphere for 2-20 hours to crystallize. In order to remove the residual solvent in samples as far as possible, a second treatment at 200 to 400° C. for 2-20 hours will be conducted. A similar procedure can be employed using $Na_2X$, where X is S, Se, or a combination thereof in place of the $Li_2Se$.

By using first-principles calculations, the present inventors have provided a class of new sodium and lithium ionic conductors. These compounds have extraordinarily high ionic conductivity at room temperature, exceeding the performance of currently known solid-state conductors. Thus, a significant improvement in solid state electrolyte materials is provided by the present disclosure.

This disclosure further encompasses the following embodiments, which are non-limiting.

Embodiment 1

A solid electrolyte material of the formula $A_{7\pm2x}P_3X_{(11\pm x)-y}O_y$, wherein A is Li or Na, wherein X is S, Se, or a combination thereof, provided that when M is Li, X is Se, and wherein $0 \leq x \leq 0.25$ and $0 \leq y \leq 2.5$.

Embodiment 2

The solid electrolyte of embodiment 1, wherein y is 0 and the solid electrolyte material is of the formula $A_{7\pm2x}P_3X_{11\pm x}$ wherein A is Li or Na, wherein X is S, Se, or a combination thereof, provided that when M is Li, X is Se, and wherein $0 \leq x \leq 0.25$.

Embodiment 3

The solid electrolyte of embodiment 1 or 2, wherein the solid electrolyte material has an ionic conductivity of greater than or equal to 5 mS/cm at 23° C.

Embodiment 4

The solid electrolyte of any one of embodiments 1 to 3, wherein A is Li, X is Se, and x is 0.

Embodiment 5

The solid electrolyte of embodiment 4, wherein the solid electrolyte material has an ionic conductivity of 5 to 55 mS/cm at 23° C.

Embodiment 6

The solid electrolyte of embodiment 4 or 5, wherein the solid electrolyte material has a body centered cubic crystal structure having an a-axis length lattice constant of 12.8 to 14.3 angstroms, a b-axis length lattice constant of 6.1 to 6.9 angstroms, and a c-axis lattice constant of 12.7 to 14.1 angstroms, when analyzed by X-ray powder diffraction using Cu Kα radiation.

Embodiment 7

The solid electrolyte of any one of embodiments 4 to 6, having a first peak at a diffraction angle of 21 to 24 degrees 2θ, and a second peak at a diffraction angle of 26 to 29 degrees 2θ, when analyzed by X-ray powder diffraction using Cu Kα radiation.

Embodiment 8

The solid electrolyte of any of embodiments 1 to 3, wherein A is Na, X is S, Se, or a combination thereof, and x is 0.

Embodiment 9

The solid electrolyte of embodiment 8, wherein A is Na, X is S, and x is 0.

Embodiment 10

The solid electrolyte of embodiment 9, wherein the solid electrolyte material has an ionic conductivity of 5 to 15 mS/cm at 23° C.

Embodiment 11

The solid electrolyte of embodiment 9 or 10, wherein the material has a body centered cubic crystal structure having an a-axis length lattice constant of 13.3 to 14.8 angstroms, a b-axis length lattice constant of 6.1 to 6.9 angstroms, and a c-axis lattice constant of 12.8 to 14.3 angstroms, when analyzed by X-ray powder diffraction using Cu Kα radiation.

Embodiment 12

The solid electrolyte of any of embodiments 9 to 11, having a first peak at a diffraction angle of 15 to 18 degrees 2θ, and a second peak at a diffraction angle of 26 to 29 degrees 2θ, when analyzed by X-ray powder diffraction using Cu Kα radiation.

Embodiment 13

The solid electrolyte of embodiment 8, wherein A is Na, X is Se, and x is 0.

Embodiment 14

The solid electrolyte of embodiment 13, wherein the solid electrolyte material has an ionic conductivity of 5 to 15 mS/cm at 23° C.

Embodiment 15

The solid electrolyte of embodiments 13 or 14, wherein the solid electrolyte material has a body centered cubic crystal structure having an a-axis length lattice constant of 14.3 to 15.9 angstroms, a b-axis length lattice constant of 6.5 to 7.2 angstroms, and a c-axis lattice constant of 13.2 to 14.7 angstroms, when analyzed by X-ray powder diffraction using Cu Kα radiation.

Embodiment 16

The solid electrolyte of any of embodiments 13 to 15, having a first peak at a diffraction angle of 14 to 17 degrees 2θ and a second peak at a diffraction angle of 26 to 29 degrees 2θ, when analyzed by X-ray powder diffraction using Cu Kα radiation.

Embodiment 17

The solid electrolyte of any of embodiments 1 to 16, wherein an anion sublattice of the material has a body centered cubic crystal structure.

Embodiment 18

An electrochemical cell comprising a positive electrode, a negative electrode, and a solid electrolyte material of the formula $A_{7\pm2x}P_3X_{((11\pm x)-y)}O_y$, wherein A is Li or Na, wherein X is S, Se, or a combination thereof, provided that when M is Li, X is Se, and wherein $0 \leq x \leq 0.25$ and $0 \leq y \leq 2.5$, wherein the solid electrolyte is disposed between the positive electrode and the negative electrode.

Embodiment 19

The electrochemical cell of embodiment 18, further comprising a separator disposed between the positive electrode and the negative electrode.

Embodiment 20

The electrochemical cell of embodiment 18 or 19, wherein the solid electrolyte comprises a material of the formula $Li_7P_3Se_{11}$.

Embodiment 21

The electrochemical cell of embodiment 18 or 19, wherein the solid electrolyte material is of the formula $Na_7P_3X_{11}$, wherein X is S or Se.

Embodiment 22

A method for the manufacture of a solid electrolyte material, the method comprising: combining a sodium source or a lithium source and a precursor material comprising P and Se or S, provided that when a lithium source is used, the precursor material comprises P and Se, to form a mixture, and heat-treating the mixture to manufacture the solid electrolyte material, wherein the material is of the formula $A_{7\pm2x}P_3X_{((11\pm x)-y)}O_y$, wherein A is Li or Na, wherein X is S, Se, or a combination thereof, provided that when M is Li, X is Se, and wherein $0 \leq x \leq 0.25$ and $0 \leq y \leq 2.5$.

Embodiment 23

A method for the manufacture of an electrochemical cell, the method comprising: providing a positive electrode, providing a negative electrode, and disposing a solid electrolyte material of the formula $A_{7\pm2x}P_3X_{((11\pm x)-y)}O_y$, wherein A is Li or Na, wherein X is S, Se, or a combination thereof, provided that when M is Li, X is Se, and wherein 0≤x≤0.25 and 0≤y≤2.5, between the positive electrode and the negative electrode to manufacture the electrochemical cell.

The compositions, methods, and articles can alternatively comprise, consist of, or consist essentially of, any appropriate components or steps herein disclosed. The compositions, methods, and articles can additionally, or alternatively, be formulated so as to be devoid, or substantially free, of any steps, components, materials, ingredients, adjuvants, or species that are otherwise not necessary to the achievement of the function or objectives of the compositions, methods, and articles.

All ranges disclosed herein are inclusive of the endpoints, and the endpoints are independently combinable with each other. "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A solid electrolyte material of the formula $A_{7\pm2x}P_3X_{((11\pm x)-y)}O_y$
   wherein A is Li or Na,
   wherein X is S, Se, or a combination thereof, provided that when is Li, X is Se,
   wherein 0<x<0.25 and 0<y<2.5,
   wherein an anion sublattice of the solid electrolyte material has a body centered cubic crystal structure,
   wherein the solid electrolyte material has a triclinic structure, and
   wherein the solid electrolyte material has an ionic conductivity of greater than or equal to 5 mS/cm at 23° C.

2. The solid electrolyte of claim 1, wherein A is Li, X is Se, and x is 0.

3. The solid electrolyte of claim 2, wherein the solid electrolyte material has an ionic conductivity of 5 to 55 mS/cm at 23° C.

4. The solid electrolyte of claim 2, wherein the solid electrolyte material has a triclinic crystal structure having an a-axis length lattice constant of 12.8 to 14.3 angstroms, a b-axis length lattice constant of 6.1 to 6.9 angstroms, and a c-axis lattice constant of 12.7 to 14.1 angstroms, when analyzed by X-ray powder diffraction using Cu Kα radiation.

5. The solid electrolyte of claim 2, having a first peak at a diffraction angle of 21 to 24 degrees 2θ, and a second peak at a diffraction angle of 26 to 29 degrees 2θ, when analyzed by X-ray powder diffraction using Cu Kα radiation.

6. The solid electrolyte of claim 1, wherein A is Na, X is S, Se, or a combination thereof, and x is 0.

7. The solid electrolyte of claim 6, wherein A is Na, X is Se, and x is 0.

8. The solid electrolyte of claim 7, wherein the solid electrolyte material has an ionic conductivity of 5 to 15 mS/cm at 23° C.

9. The solid electrolyte of claim 7, wherein the solid electrolyte material has a triclinic crystal structure having an a-axis length lattice constant of 14.3 to 15.9 angstroms, a b-axis length lattice constant of 6.5 to 7.2 angstroms, and a c-axis lattice constant of 13.2 to 14.7 angstroms, when analyzed by X-ray powder diffraction using Cu Kα radiation.

10. The solid electrolyte of claim 7, having a first peak at a diffraction angle of 14 to 17 degrees 2θ and a second peak at a diffraction angle of 26 to 29 degrees 2θ, when analyzed by X-ray powder diffraction using Cu Kα radiation.

11. An electrochemical cell comprising
    a positive electrode,
    a negative electrode,
    and a solid electrolyte material of the formula $A_{7\pm2x}P_3X_{((11\pm x)-y)}O_y$
    wherein A is Li or Na,
    wherein X is S, Se, or a combination thereof, provided that when is Li, X is Se,
    wherein 0<x<0.25 and 0<y<2.5,
    wherein an anion sublattice of the solid electrolyte material has a body centered cubic crystal structure,
    wherein the solid electrolyte material has a triclinic structure, and
    wherein the solid electrolyte material has an ionic conductivity of greater than or equal to 5 mS/cm at 23° C.,
    wherein the solid electrolyte material is disposed between the positive electrode and the negative electrode.

12. The electrochemical cell of claim 11, further comprising a separator disposed between the positive electrode and the negative electrode.

13. The electrochemical cell of claim 11, wherein the solid electrolyte material is of the formula $Li_7P_3Se_{11}$.

14. The electrochemical cell of claim 11, wherein the solid electrolyte material is of the formula $Na_7P_3X_{11}$, wherein X is S or Se.

15. A method for the manufacture of a material for a solid electrolyte, the method comprising:
    combining a sodium source or a lithium source and a precursor material comprising P and Se or S, provided that when a lithium source is used, the precursor material comprises P and Se, to form a mixture, and
    heat-treating the mixture to manufacture the material for a solid electrolyte,
    wherein the material is of the formula $A_{7\pm2x}P_3X_{((11\pm x)-y)}O_y$
    wherein A is Li or Na, wherein X is S, Se, or a combination thereof, provided that when is Li, X is Se, wherein $0<x<0.25$ and $0<y<2.5$, wherein an anion sublattice of the material has a body centered cubic crystal structure, wherein the solid electrolyte material has a triclinic structure, and wherein the material has an ionic conductivity of greater than or equal to 5 mS/cm at 23° C.

16. A method for the manufacture of an electrochemical cell, the method comprising: providing a positive electrode, providing a negative electrode, and disposing a solid electrolyte material of the formula $A_{7\pm 2x}P_3X_{((11\pm x)-y)}O_y$ wherein A is Li or Na, wherein X is S, Se, or a combination thereof, provided that when is Li, X is Se, wherein $0<x<0.25$ and $0<y<2.5$, wherein an anion sublattice of the solid electrolyte material has a body centered cubic crystal structure, wherein the solid electrolyte material has a triclinic structure, and wherein the solid electrolyte material has an ionic conductivity of greater than or equal to 5 mS/cm at 23° C., between the positive electrode and the negative electrode to manufacture the electrochemical cell.

17. A solid electrolyte material of the formula $A_{7\pm 2x}P_3X_{((11\pm x)-y)}O_y$ wherein A is Li or Na, wherein X is S, Se, or a combination thereof, provided that when A is Li, X is Se, wherein $0 \leq x \leq 0.25$ and $0 \leq y \leq 2.5$, wherein the solid electrolyte material has a triclinic structure, and wherein the solid electrolyte material has an ionic conductivity of greater than or equal to 5 mS/cm at 23° C.

* * * * *